United States Patent
Nakamura

(10) Patent No.: US 9,563,619 B2
(45) Date of Patent: Feb. 7, 2017

(54) DICTIONARY DEVICE, DICTIONARY SEARCH METHOD, DICTIONARY SYSTEM, AND SERVER DEVICE

(71) Applicant: CASIO COMPUTER CO., LTD., Shibuya-ku, Tokyo (JP)

(72) Inventor: Kazuhisa Nakamura, Akiruno (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 449 days.

(21) Appl. No.: 14/109,547

(22) Filed: Dec. 17, 2013

(65) Prior Publication Data
US 2014/0180680 A1    Jun. 26, 2014

(30) Foreign Application Priority Data
Dec. 21, 2012   (JP) .................................. 2012-279589

(51) Int. Cl.
*G06F 17/27*    (2006.01)
*G06F 17/28*    (2006.01)
*G06F 17/21*    (2006.01)

(52) U.S. Cl.
CPC ........... *G06F 17/2735* (2013.01); *G06F 17/28* (2013.01); *G06F 17/2854* (2013.01); *G06F 17/21* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,914,704 A | * | 4/1990 | Cole | G06F 17/21 704/235 |
| 5,220,649 A | * | 6/1993 | Forcier | G06F 3/0488 715/273 |
| 5,844,561 A | * | 12/1998 | Tanimoto | G06F 3/0488 707/999.003 |
| 5,896,321 A | * | 4/1999 | Miller | G06F 3/023 365/189.15 |
| 6,616,703 B1 | * | 9/2003 | Nakagawa | G06F 17/273 704/10 |

(Continued)

FOREIGN PATENT DOCUMENTS

JP    2004-302802 A    10/2004
JP    2005-189993 A     7/2005

(Continued)

OTHER PUBLICATIONS

Japanese Office Action (and English translation thereof) dated Mar. 1, 2016, issued in counterpart Japanese Application No. 2012-279589.

*Primary Examiner* — Pierre-Louis Desir
*Assistant Examiner* — David Kovacek
(74) *Attorney, Agent, or Firm* — Holtz, Holtz & Volek PC

(57) ABSTRACT

On a text display screen displayed on a touch panel color display unit, after a plurality of desired words are specified by a touch operation and it is detected that the touched points are moved downward, an example sentence including each of the specified words is searched for in dictionary data corresponding to the character type of each of the words, and displayed. When it is detected that the touched points are moved upward, a phrase including each of the specified words is searched for in the dictionary data corresponding to the character type of each of the words, and displayed.

13 Claims, 7 Drawing Sheets

(56) References Cited

U.S. PATENT DOCUMENTS

| | | | |
|---|---|---|---|
| 2004/0155869 A1* | 8/2004 | Robinson | G06F 3/0219 345/168 |
| 2004/0249632 A1* | 12/2004 | Chacon | G06F 17/279 704/9 |
| 2005/0286743 A1* | 12/2005 | Kurzweil | G10L 13/00 382/114 |
| 2006/0023945 A1* | 2/2006 | King | H04N 1/00244 382/173 |
| 2006/0288004 A1* | 12/2006 | Toriyama | G06F 17/30634 |
| 2007/0260452 A1* | 11/2007 | Lee | G06F 17/2735 704/10 |
| 2009/0058823 A1* | 3/2009 | Kocienda | G06F 3/0236 345/173 |
| 2009/0182552 A1* | 7/2009 | Fyke | G06F 3/0488 704/9 |
| 2009/0187846 A1* | 7/2009 | Paasovaara | G06F 3/0237 715/780 |
| 2009/0228792 A1* | 9/2009 | van Os | G06F 3/0488 715/702 |
| 2010/0115402 A1* | 5/2010 | Knaven | G06F 17/276 715/261 |
| 2010/0128994 A1* | 5/2010 | Zwolinski | G06F 1/1626 382/229 |
| 2010/0214314 A1* | 8/2010 | Hanatani | G06F 17/24 345/593 |
| 2010/0235723 A1* | 9/2010 | Nakajima | G06F 17/2735 715/205 |
| 2011/0035207 A1* | 2/2011 | Abe | G06F 17/2735 704/2 |
| 2011/0055703 A1* | 3/2011 | Lundback | H04R 27/00 715/727 |
| 2011/0078568 A1* | 3/2011 | Park | G06F 3/04883 715/702 |
| 2011/0115702 A1* | 5/2011 | Seaberg | G06F 3/017 345/156 |
| 2011/0131487 A1* | 6/2011 | Nakajima | G06F 17/241 715/259 |
| 2011/0167350 A1 | 7/2011 | Hoellwarth | |
| 2011/0219304 A1* | 9/2011 | Nakano | G06F 17/21 715/705 |
| 2012/0072838 A1* | 3/2012 | Ramachandra | G06F 3/0237 715/271 |
| 2012/0131451 A1* | 5/2012 | Abe | G06F 3/0488 715/260 |
| 2013/0090919 A1* | 4/2013 | Nakano | G06F 17/2735 704/9 |
| 2014/0173407 A1* | 6/2014 | Kruglick | G06F 17/276 715/226 |
| 2014/0180680 A1* | 6/2014 | Nakamura | G06F 17/2735 704/10 |
| 2015/0356884 A1* | 12/2015 | Nakamura | G09B 19/0061 434/154 |

FOREIGN PATENT DOCUMENTS

| | | |
|---|---|---|
| JP | 2009-294785 A | 12/2009 |
| JP | 2011-204002 A | 10/2011 |

* cited by examiner

DICTIONARY DEVICE, DICTIONARY SEARCH METHOD, DICTIONARY SYSTEM, AND SERVER DEVICE

CROSS REFERENCE TO RELATED APPLICATION

This application is based upon and claims the benefit of priority under 35 USC 119 of Japanese Patent Application No. 2012-279589 filed on Dec. 21, 2012, the entire disclosure of which, including the descriptions, claims, drawings, and abstracts, is incorporated herein by reference in its entirety.

BACKGROUND OF THE INVENTION

1. Field of the Invention

The present invention relates to a dictionary device, a dictionary search method, a dictionary system, a server device and the like.

2. Background Art

In an electronic dictionary device in the related art, to select a plurality of words and to search for an example sentence and a phrase including the selected words, it is necessary to specify a search method whether to use an example sentence search or a phrase search before selecting each of the words and performing a search.

In an electronic device in the related art including a dictionary function by which different search methods can be easily specified, the following has been considered. That is, dictionary information is displayed on a touch panel display unit. When a desired character string in the displayed dictionary information is touched and specified in a forward direction, a direction word including the specified characters as ahead word is searched for in dictionary data corresponding to the specified character type, and displayed. When a desired character string is touched and specified in a backward direction, on the other hand, a direction word including the specified characters as a final word is searched for in the dictionary data, and displayed (for example, JP 2004-302802 A).

SUMMARY OF THE INVENTION

In the electronic device in the related art including a dictionary function, the search methods can be switched as to whether to perform a search including the specified characters as the head word or to perform a search including the specified characters as the final word, in accordance with the touched and specified direction of the character string in the dictionary information.

However, it is not easy to specify a plurality of independent words and to switch the search methods.

In view of the forgoing problems, an object of the present invention is to provide a dictionary device, a dictionary search method, a dictionary program, a dictionary system, and a server device and a terminal device thereof, which make it possible to specify a plurality of independent words and to switch the search methods easily and quickly to perform a dictionary search.

A dictionary device according to an embodiment of the present invention includes: a display unit; a dictionary storage unit storing dictionary data of an example sentence or a phrase including a plurality of words; a sentence display control unit configured to display a sentence including a plurality of words on the display unit; a specified position detecting unit configured to detect a plurality of specified positions corresponding to a user's operation on the display unit on which the sentence including the words is displayed by the sentence display control unit; a movement state determining unit configured to determine a movement state of the specified positions, after the specified positions on the display unit are detected by the specified position detecting unit; and a search unit configured to search the dictionary data for an example sentence or a phrase including the words included in the sentence and specified correspondingly to the specified positions, in accordance with the movement state of the specified positions determined by the movement state determining unit.

A dictionary system according to an embodiment of the present invention includes a server device and a terminal device which include a communication function performed through a network. The server device includes: a dictionary storage unit storing dictionary data of an example sentence or a phrase including a plurality of words; a specified information receiving unit configured to receive information of a plurality of specified positions and information of a plurality of words specified correspondingly to the specified positions, both pieces of information being sent by a specified information sending unit in the terminal device; a movement state determining unit configured to determine a movement state of the specified positions, after the information of the specified positions and the information of the words specified correspondingly to the specified positions are received by the specified information receiving unit; a search unit configured to search the dictionary data for an example sentence or a phrase including the words received by the specified information receiving unit, in accordance with the movement state of the specified positions determined by the movement state determining unit; and a search result sending unit configured to send, to the terminal device, the example sentence or the phrase searched for by the search unit. The terminal device includes: a display unit; a sentence display control unit configured to display a sentence including a plurality of words on the display unit; a specified position detecting unit configured to detect a plurality of specified positions corresponding to a user's operation on the display unit on which the sentence including the words is displayed by the sentence display control unit; the specified information sending unit configured to send, to the server device, the information of the specified positions detected by the specified position detecting unit and the information of the words included in the sentence and specified correspondingly to the specified positions; a search result receiving unit configured to receive the example sentence or the phrase sent by the search result sending unit of the server device in response to the information of the specified positions and the information of the words corresponding to the specified positions sent by the specified information sending unit; and a search result display control unit configured to display, on the display unit, the example sentence or the phrase received by the search result receiving unit.

DETAILED DESCRIPTION OF THE PREFERRED EMBODIMENTS

In the following, an embodiment of the present invention will be described with reference to the drawings.

Figure 1:
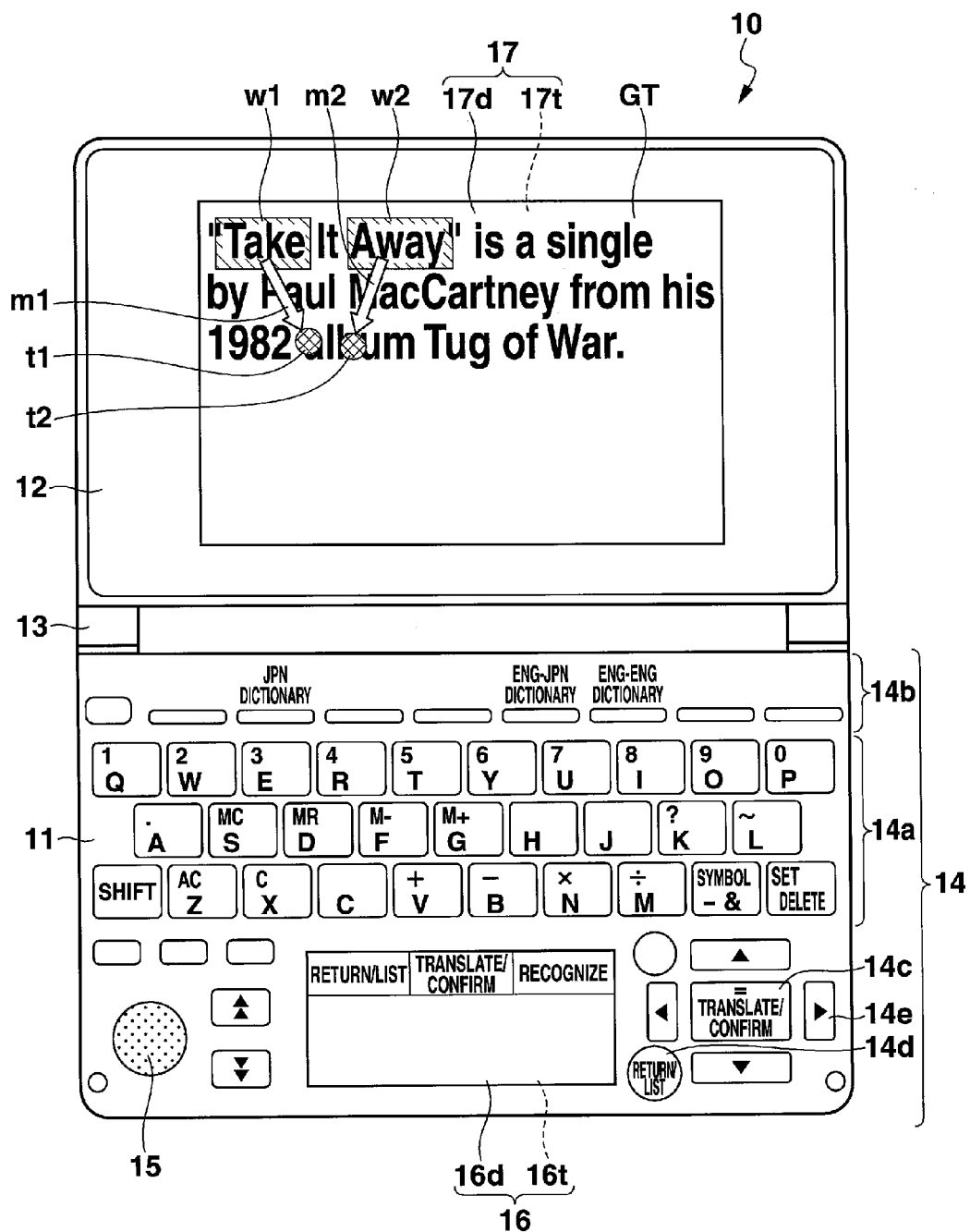
FIG. 1 is a front view showing an outer structure of an electronic dictionary device as a dictionary device according to an embodiment of the present invention.

FIG. 1 is a front view showing an outer structure of an electronic dictionary device 10 as a dictionary device according to an embodiment of the present invention.

The dictionary device may be formed as a portable device dedicated for an electronic dictionary (electronic dictionary device 10) described in the following, or as a touch panel personal digital assistant (PDA) 10T (see FIG. 3), a personal computer (PC), a mobile phone, an electronic book, a portable game console, and the like, which include a dictionary function.

The electronic dictionary device 10 includes a collapsible case in which a body case 11 and a lid case 12 can be unfolded/folded via a hinge 13. On a surface of the body case 11 of the unfolded collapsible case, a key input unit (keyboard) 14 and a handwriting input unit (sub-screen) 16 are provided. The key input unit 14 includes, for example, character input keys 14a, dictionary specification keys 14b, a [Translate/Confirm] key 14c, a [Return/List] key 14d, cursor keys 14e, and a speaker 15.

The handwriting input unit (sub-screen) 16 includes a touched position detecting device and a display device, which are integrated with each other. The touched position detecting device detects a position (including multi-touch) touched by a pen, a finger, and the like of a user. The handwriting input unit (sub-screen) 16 is formed on a central front side of the key input unit 14 by overlaying a transparent touch panel 16t on a 256×64 dot color liquid-crystal display screen 16d, for example. An input region of the handwriting input unit (sub-screen) 16 can be switched to a handwriting character (Chinese Character) input region for a handwritten character, an input region for various function icons, or a region in which the two input regions are mixed, when necessary.

When the handwriting input unit (sub-screen) 16 is switched to the handwriting character input region, tracks of the handwriting are echoed back to the liquid-crystal display screen 16d and displayed thereon.

On a surface of the lid case 12, a 480×320 dot touch panel color display unit (main screen) 17 with a backlight, for example, is provided on the most part of the entire surface. Like the handwriting input unit (sub-screen) 16, the touch panel color display unit (main screen) 17 also includes a touched position detecting device and a display device which are integrated with each other, and is formed by overlaying a transparent touch panel 17t on a color liquid-crystal display screen 17d. The touched position detecting device is for detecting a position (including multi-touch) touched by a pen, a finger, and the like of a user.

The electronic dictionary device 10 includes, for example, the following dictionary search functions.

On a text display screen GT of the touch panel color display unit (main screen) 17, arbitrary dictionary information or text data is displayed. When a plurality of independent words (for example, "Take" w1 and "Away" w2) are specified by being respectively touched with two fingers on the text display screen GT and the touched positions (points) t1 and t2 are moved downward in directions of coming closer to each other, as shown by arrows m1 and m2, an example sentence including both of the words "Take" w1 and "Away" w2 adjoined to each other in the same word order is searched for and displayed (See FIGS. 1, 6A and 6B).

Figure 5A:
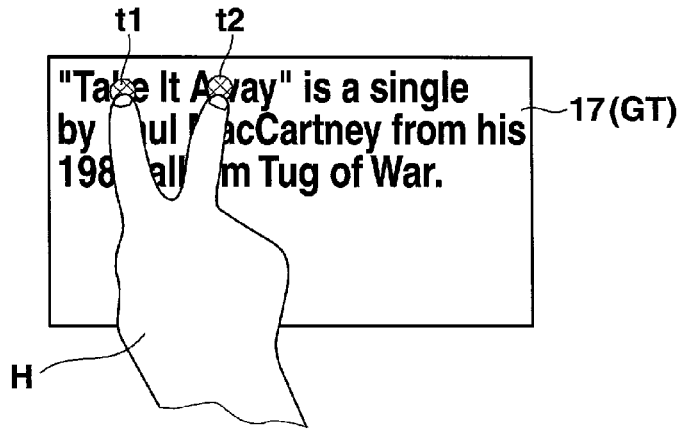
FIGS. 5A to 5D are views showing a display operation (part 1) on a touch panel color display unit, accompanied with the word specification search process of the electronic dictionary device.
Figure 5B:
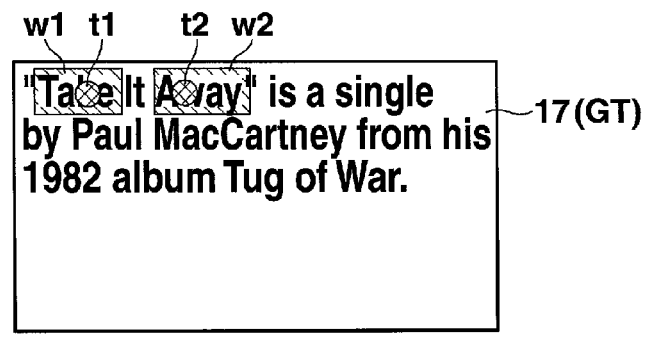
Figure 5C:
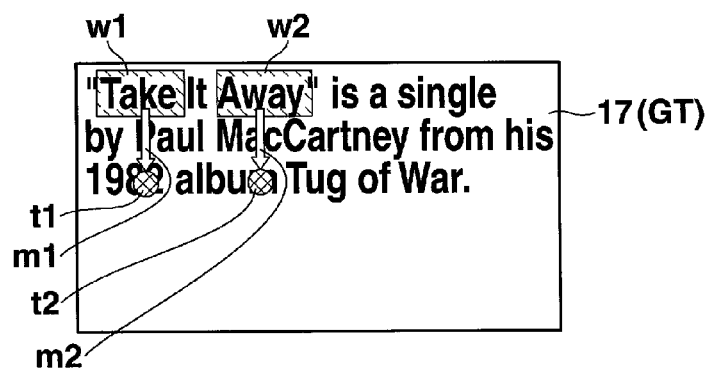

Also, when the plurality of independent words (for example, "Take" w1 and "Away" w2) are specified by being respectively touched with two fingers and the touched positions (points) t1 and t2 are moved downward with a distance therebetween kept substantially the same as shown by, for example, arrows m1 and m2 in FIG. 5C, an example sentence including both of the words "Take" w1 and "Away" w2 in the same word order with another word therebetween is searched for and displayed.

Figure 7A:
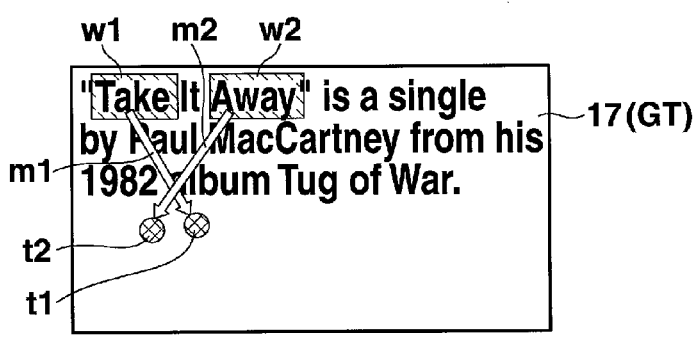
FIGS. 7A and 7B are views showing a display operation (part 3) on the touch panel color display unit, accompanied with the word specification search process of the electronic dictionary device.

Moreover, when the plurality of independent words (for example, "Take" w1 and "Away" w2) are specified by being respectively touched with two fingers and the touched positions (points) t1 and t2 are moved downward in crossed directions as shown by, for example, arrows m1 and m2 in FIG. 7A, an example sentence including both of the words "Take" w1 and "Away" w2 in the opposite word order is searched for and displayed.

Figure 8A:
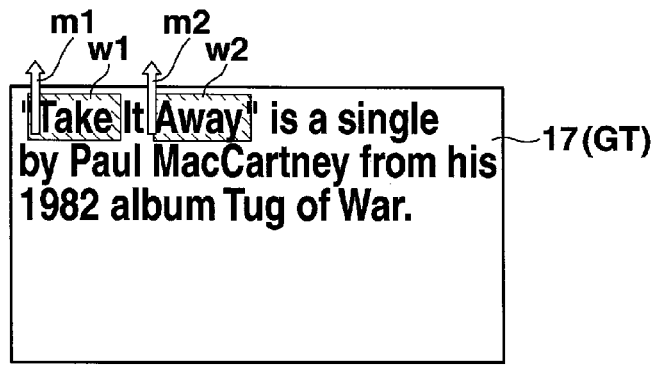
FIGS. 8A and 8B are views showing a display operation (part 4) on the touch panel color display unit, accompanied with the word specification search process of the electronic dictionary device.

Also, when the plurality of independent words (for example, "Take" w1 and "Away" w2) are specified by being respectively touched with two fingers and the touched positions (points) are moved upward with a distance therebetween kept substantially the same as shown by, for example, arrows m1 and m2 in FIG. 8A, a phrase including both of the words "Take" w1 and "Away" w2 in the same word order is searched for and displayed.

Figure 9A:
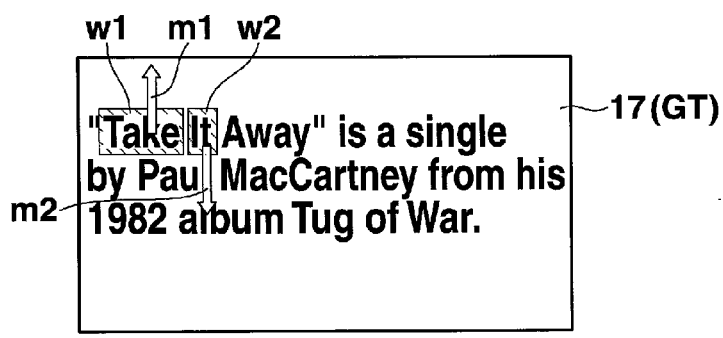
FIGS. 9A and 9B are views showing a display operation (part 5) on the touch panel color display unit, accompanied with the word specification search process of the electronic dictionary device.

Furthermore, when the plurality of independent words (for example, "Take" w1 and "It" w2) are specified by being respectively touched with two fingers and the first touched position (point) is moved upward and the second touched position (point) is moved downward as respectively shown by, for example, arrows m1 and m2 in FIG. 9A, an example sentence or a phrase including the word "It" w2 corresponding to the second touched point is searched for from among explanatory information including, as a direction word, the word "Take" w1 corresponding to the first touched point moved upward, and the example sentence or phrase is displayed.

Therefore, while arbitrary text data is displayed on the touch panel color display unit 17, a plurality of independent words can be specified in accordance with a multi-touch operation by a user, and search methods can be switched easily and quickly between an example sentence search and a phrase search, to perform a dictionary search.

Figure 2:
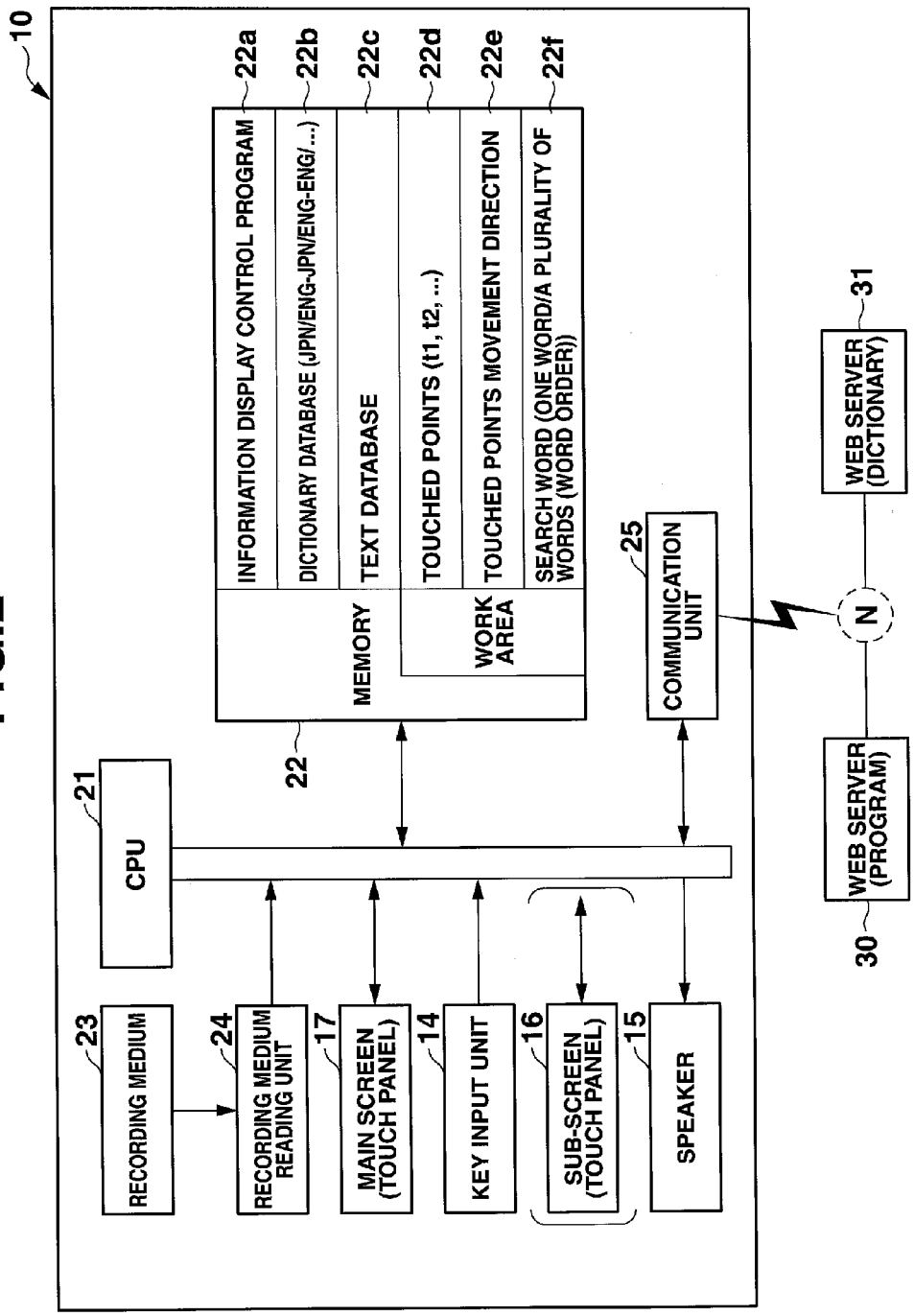
FIG. 2 is a block diagram showing a structure of an electronic circuit of the electronic dictionary device.

FIG. 2 is a block diagram showing a structure of an electronic circuit of the electronic dictionary device 10.

The electronic dictionary device 10 includes a computer which loads a program recorded in various recording media or a transmitted program, and is controlled by the loaded program. An electronic circuit of the electronic dictionary device 10 includes a central processing unit (CPU) 21.

The CPU 21 controls the operation of each part of the circuit in response to a device control program stored in a memory 22 in advance, a device control program loaded from an external recording medium 23, such as a ROM card, into the memory 22 though a recording medium reading unit 24, or a device control program loaded from a web server (program server in this case) 30 on the network N into the memory 22 through a communication unit 25.

The device control program stored in the memory 22 runs in accordance with an input signal, a communication signal, or a connection communication signal. The input signal is sent from the key input unit 14, the handwriting input unit (sub-screen) 16, or the touch panel color display unit (main screen) 17, in response to a user's operation. The communication signal is sent from each of the web servers 30, 31 . . . , on the network N connected through the communication unit 25. The connection communication signal is sent from a memory card (recording medium) 23, such as an EEPROM, a RAM, and a ROM, externally connected through the recording medium reading unit 24.

The memory 22, the recording medium reading unit 24, the communication unit 25, the key input unit 14, the speaker 15, the handwriting input unit (sub-screen) 16, the touch panel color display unit (main screen) 17 and the like are connected to the CPU 21.

A system program and a communication program are stored as the device control programs in the memory 22. The system program is responsible for the whole operation of the electronic dictionary device 10. The communication program is for the data communication with, for example, each of the web servers 30, 31 . . . , on the network N and a user's personal computer (PC) not shown, through the communication unit 25.

Also, various information display control programs 22a are stored in the memory 22. The various information display control programs are not only for displaying the dictionary information and the various text data, but also for controlling the whole process based on a dictionary database 22b and a text database 22c stored in the memory 22. The process includes a direction word search process, a process for retrieving and displaying explanatory information (such as a word meaning, an example sentence, and a phrase) corresponding to a searched direction word, and a word specification search process. The direction word search process is for searching for a direction word corresponding to a search word (character string) input. The word specification search process is for searching for an example sentence or a phrase including one or more arbitrary words which are in the displayed various texts and specified by a user's touch; the example sentence and the phrase are switched in accordance with the movement direction of the touched position (point).

The dictionary database 22b includes a plural kinds of dictionary data, such as [Japanese Dictionary], [English-Japanese Dictionary], [English-English Dictionary], and [Japanese-English Dictionary], stored in advance or downloaded. For example, in each of the dictionary data, diverse meanings of the direction words and the explanatory information which includes example sentences and phrases including the direction words are recorded in association with the direction words in an alphabetical order or in a Japanese alphabetical order (in order of the Japanese syllabary). Of course, phrase direction words, which are the combination of a plurality of words, are also recorded as the direction words in each of the dictionaries.

In the text database 22c, various kinds of text data, such as literary works, press records, and historical speeches, are stored in advance or downloaded.

Also, in a work area of the memory 22, a touched (position) point data memory 22d, a touched (position) point movement direction data memory 22e, and a search word data memory 22f are reserved.

In the touched point data memory 22d, x and y coordinates of the touched points t1, t2 . . . , are updated and stored in real time, in a predetermined sampling period. The x and y coordinates of the touched points t1, t2 . . . , are detected by the transparent touch panels 16t and 17t on the handwriting input unit (sub-screen) 16 and the touch panel color display unit (main screen) 17.

In the touched point movement direction data memory 22e, the movement direction of the x and y coordinates of the touched points t1, t2 . . . , stored in the touched point data memory 22d are updated and stored in real time, along with their movements.

In the search word data memory 22f, the search word (character string) is stored. The search word (character string) is input in a search word input area on a dictionary search screen of the dictionary selected by a user. In addition, in the search word data memory 22f, one or more words specified by a cursor operation or a touch operation are stored. The cursor operation and the touch operation are performed on a display screen of the explanatory information of the direction word searched in response to the input search word, or on a display screen GT of the arbitrary text data. When a plurality of words is specified by the cursor operation or the touch operation, the words are stored along with their word order.

In the electronic dictionary device 10 formed in this manner, the CPU 21 controls the operation of each part of the circuit according to an instruction written in the information display control program 22a (including a program for performing the direction word search process, the explanatory information display process, the word specification search process and the like), and software and hardware cooperate with each other to operate. As a result, the functions described in the following description of the operations are achieved.

Figure 3:
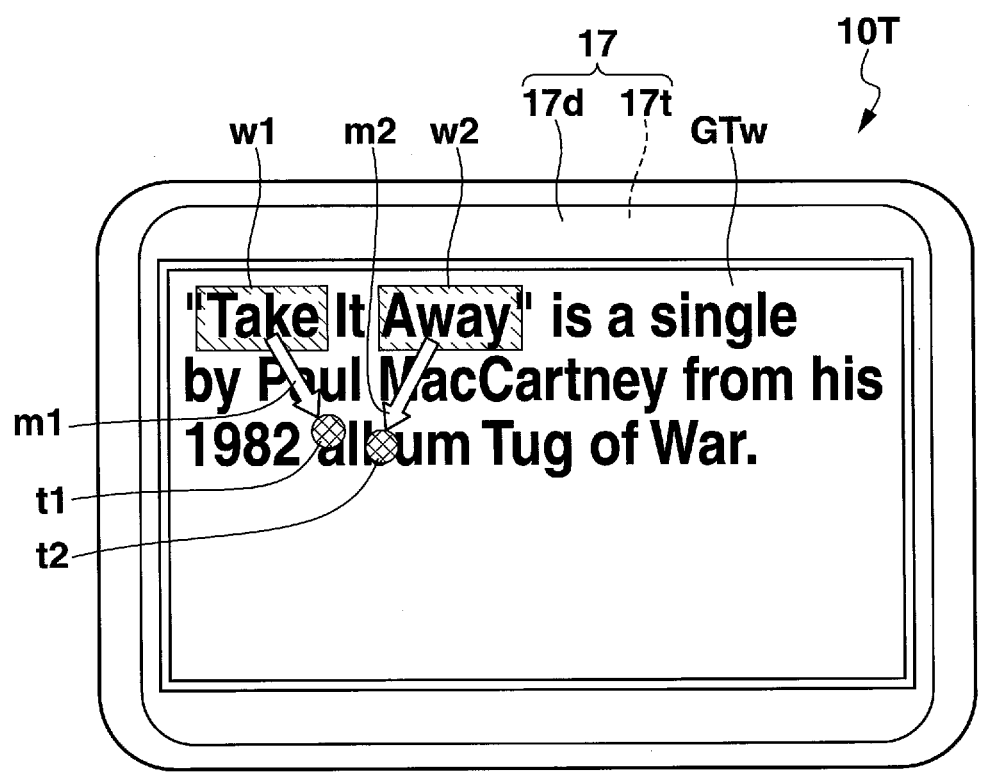
FIG. 3 is a front view showing an outer structure of a touch panel PDA including a dictionary function as a dictionary device according to another embodiment of the present invention.

Note that the embodiment of the dictionary device achieved by the electronic dictionary device 10 has been described; however, the embodiment can also be achieved, for example, by a touch panel PDA 10T with a dictionary function, as shown in FIG. 3. In the touch panel PDA 10T with the dictionary function, the input and display operations corresponding to each process of the information display control program 22a are displayed as various windows on a touch panel color display unit 17 (17d and 17t).

FIG. 3 is a front view showing an outer structure of the touch panel PDA 10T including a dictionary function as a dictionary device according to another embodiment of the present invention.

The touch panel PDA 10T in FIG. 3 shows a display operation corresponding to the word specification search process.

For example, the text display screen GT displayed on the touch panel color display unit (main screen) 17 of the electronic dictionary device 10 shown in FIG. 1 is displayed as a text display window GTw in the touch panel PDA 10T.

Next, a word specification search function for performing an example sentence search or a phrase search by specifying one or more words in the electronic dictionary device 10 will be described.

Figure 4:
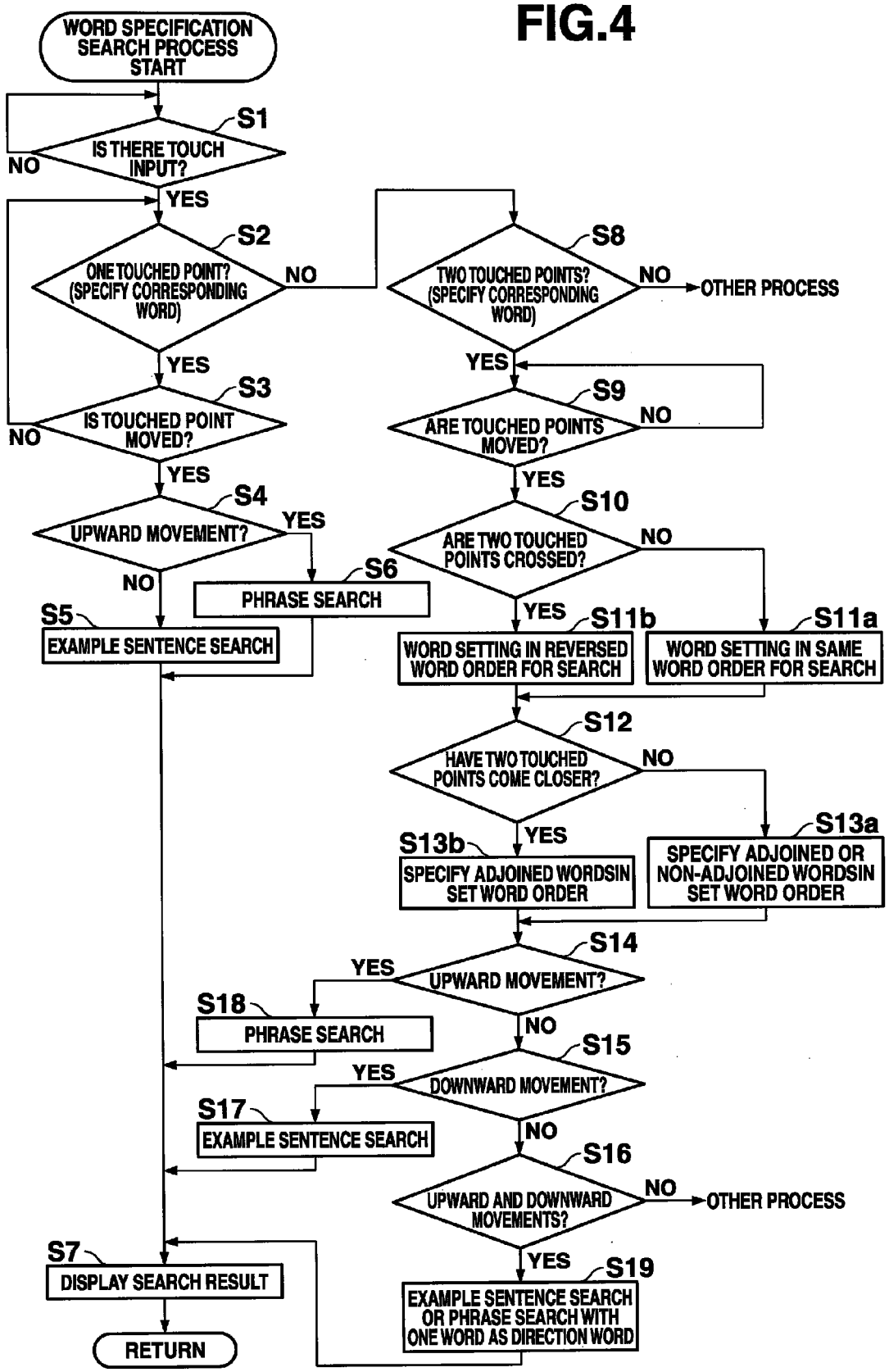
FIG. 4 is a flowchart showing a word specification search process of the electronic dictionary device.

FIG. 4 is a flowchart showing the word specification search process of the electronic dictionary device 10.

FIGS. 5A to 5D are views showing a display operation (part 1) on the touch panel color display unit 17, accompanied with the word specification search process of the electronic dictionary device 10.

Figure 6A:
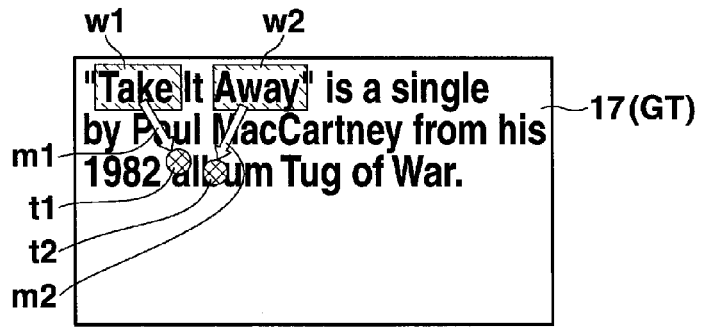
FIGS. 6A and 6B are views showing a display operation (part 2) on the touch panel color display unit, accompanied with the word specification search process of the electronic dictionary device.
Figure 6B:
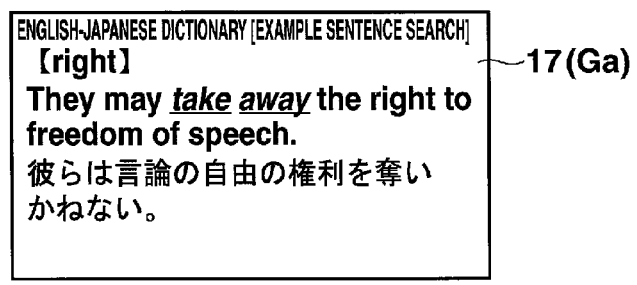

FIGS. 6A and 6B are views showing a display operation (part 2) on the touch panel color display unit 17, accompanied with the word specification search process of the electronic dictionary device 10.

Figure 7B:
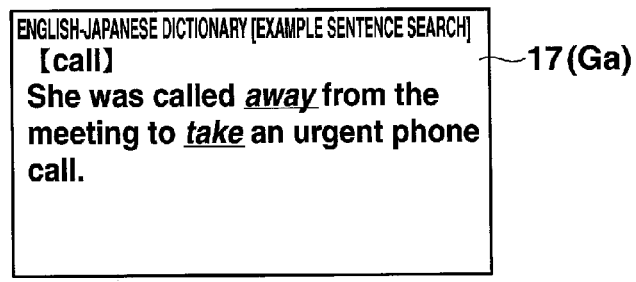

FIGS. 7A and 7B are views showing a display operation (part 3) on the touch panel color display unit 17, accompanied with the word specification search process of the electronic dictionary device 10.

Figure 8B:
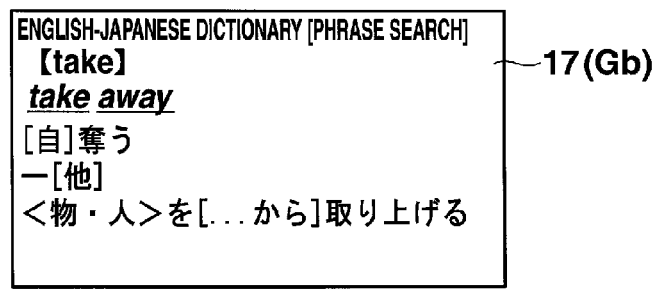

FIGS. 8A and 8B are views showing a display operation (part 4) on the touch panel color display unit 17, accompanied with the word specification search process of the electronic dictionary device 10.

Figure 9B:
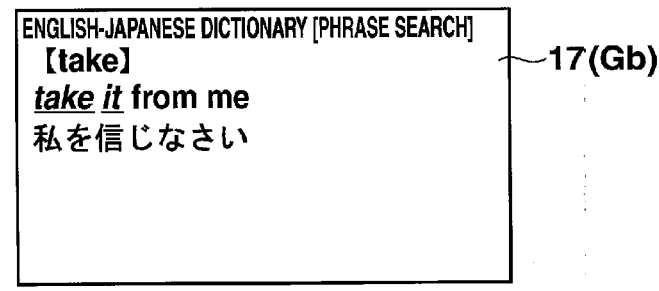

FIGS. 9A and 9B are views showing a display operation (part 5) on the touch panel color display unit 17, accompanied with the word specification search process of the electronic dictionary device 10.

For example, when a text display mode is set by a user's operation on the dictionary specification keys 14b, a text selection screen (not shown) is displayed, on which titles of the text data stored in the text database 22c are listed.

When a title desired by the user is selected by a touch operation or a cursor operation on the text selection screen, text data of the selected title is retrieved from the text database 22c and displayed as the text display screen GT on the touch panel color display unit (main screen) 17.

When a touch input corresponding to the user's operation is detected on the text display screen GT (Yes in step S1), it is determined whether the touched point detected and stored in the touched point data memory 22d is one point and one word corresponding to the touched point is specified (step S2).

Here, when it is determined that the one touched point is detected and that the one word corresponding to the touched point is specified and stored in the search word data memory 22f (Yes in step S2), it is then determined whether there is a movement in the touched point (step S3).

When the one touched point is determined to be moved downward, not upward, based on the movement direction of the touched point stored in the touched point movement direction data memory 22e (No in step S4), an example sentence including the one word corresponding to the touched point and stored in the search word data memory 22f is searched for in the dictionary data which is in the dictionary database 22b and corresponds to a character type of the word (step S5). Then, an example sentence search screen Ga which shows the search result is displayed on the touch panel color display unit 17 (step S7).

Also, in step S4, when the one touched point is determined to be moved upward based on the movement direction of the touched point stored in the touched point movement direction data memory 22e (Yes in step S4), a phrase including the one word corresponding to the touched point and stored in the search word data memory 22f is searched for in the dictionary data which is in the dictionary database 22b and corresponds to a character type of the word (step S6). Then, a phrase search screen Gb which shows the search result is displayed on the touch panel color display unit 17 (step S7).

On the other hand, as shown in FIG. 5A, when a touch input H corresponding to the user's operation is detected on the text display screen GT displayed on the touch panel color display unit 17 (Yes in step S1), and if there are two detected touched points t1 and t2, and as shown in FIG. 5B, it is determined that two words "Take" w1 and "Away" w2 are specified correspondingly to the touched points t1 and t2 and stored in the search word data memory 22f (Yes in step S8), it is determined whether there is a movement in each of the touched points (step S9).

When the two touched points t1 and t2 are determined to be moved based on the movement direction of each of the touched points t1 and t2 stored in the touched point movement direction data memory 22e (Yes in step S9), it is determined whether movement tracks of the two touched points t1 and t2 are crossed (step S10).

Here, when it is determined that the movement tracks of the two touched points t1 and t2 are not crossed (No in step S10), the two words "Take" w1 and "Away" w2 stored in the search word data memory 22f are set as search words with their word order maintained (step S11a).

Also, when it is determined that the movement tracks of the two touched points t1 and t2 are crossed (Yes in step S10), the two words "Take" w1 and "Away" w2 stored in the search word data memory 22f are set as search words with their word order reversed (step S11b).

Furthermore, it is determined whether the movement tracks of the two touched points t1 and t2 are moved closer to each other at a rate higher than a threshold level set in advance (step S12).

Here, when it is determined that the movement tracks of the two touched points t1 and t2 are not moved closer to each other (No in step S12), regarding the two words "Take" w1 and "Away" w2 stored in the search word data memory 22f, the combination of the words in the set word order is set as search words, in which each word is adjoined to the other word or away from the other word with a different word therebetween (step S13a).

Also, when it is determined that the movement tracks of the two touched points t1 and t2 are moved closer to each other (Yes in step S12), regarding the two words "Take" w1 and "Away" w2 stored in the search word data memory 22f, the combination of the words in the set word order is set as search words, in which each word is adjoined to the other word (step S13b).

That is, as shown by arrows m1 and m2 in FIG. 5C, when the two touched points t1 and t2 are moved downward with the distance therebetween kept substantially the same (Yes in step S9), the word order of the two words "Take" w1 and "Away" w2 stored in the search word data memory 22f is maintained (No in step S10→S11a), the combination of the words in the same word order is set as search words, in which each word is adjoined to the other word or away from the other word (No in step S12→S13a), and the movements of the two touched points t1 and t2 are determined to be downward (Yes in step S15).

Figure 5D:
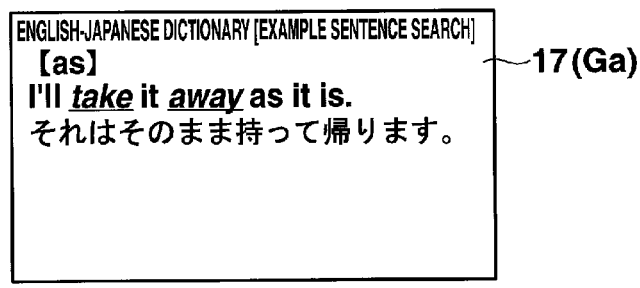

Then, an example sentence including the combination of the two words "Take" w1 and "Away" w2 corresponding to the touched points and stored in the search word data memory 22f is searched for, in the dictionary data which is in the dictionary database 22b and corresponds to the character type of each of the words, each word being away from the other word in the same word order in the combination (step S17). Then, as shown in FIG. 5D, the example sentence search screen Ga which shows the search result "[as] I'll take it away as it is." is displayed on the touch panel color display unit 17 (step S7).

Also, as shown by arrows m1 and m2 in FIG. 6A, when the two touched points t1 and t2 are moved downward and closer to each other (Yes in step S9), the word order of the two words "Take" w1 and "Away" w2 stored in the search word data memory 22*f* is maintained (No in step S10→S11*a*), the combination of the words in the same word order is set as search words, in which each word is adjoined to the other word (Yes in step S12→S13*b*), and the movements of the two touched points t1 and t2 are determined to be downward (Yes in step S15).

Then, an example sentence including the combination of the adjoined two words "Take" w1 and "Away" w2 in the same word order is searched for in the dictionary data which is in the dictionary database 22*b* and corresponds to the character type of each of the words, the two words "Take" w1 and "Away" w2 corresponding to the touched points and being stored in the search word data memory 22*f* (step S17). Then, as shown in FIG. 6B, the example sentence search screen Ga which shows the search result "[right] They may take away the right to freedom of speech." is displayed on the touch panel color display unit 17 (step S7).

When the two touched points t1 and t2 are moved downward in the crossed directions as shown by arrows m1 and m2 in FIG. 7A (Yes in step S9), the word order of the two words "Take" w1 and "Away" w2 stored in the search word data memory 22*f* is reversed (Yes in step S10→S11*b*), and the combination of the words in that word order is set as search words, in which each word is adjoined to or away from the other word (No in step S12→S13*a*), and the movements of the two touched points are determined to be downward (Yes in step S15).

Then, an example sentence including the combination of the two words "Take" w1 and "Away" w2 corresponding to the touched points and stored in the search word data memory 22*f* is searched for in the dictionary data which is in the dictionary database 22*b* and corresponds to the character type of each of the words, each word being away from the other word in the reversed word order in the combination (step S17). Then, as shown in FIG. 7B, the example sentence search screen Ga which shows the search result "[call] She was called away from the meeting to take an urgent phone call." is displayed on the touch panel color display unit 17 (step S7).

Also, as shown by arrows m1 and m2 in FIG. 8A, when the two touched points t1 and t2 are moved upward with the distance therebetween kept substantially the same (Yes in Step S9), the word order of the two words "Take" w1 and "Away" w2 stored in the search word data memory 22*f* is maintained (No in step S10→S11*a*), the combination of the words in the word order is set as search words, in which each word is adjoined to or away from the other word (No in step S12→S13*a*), and the movements of the two touched points are determined to be upward (Yes in step S14).

Then, the phrase including the combination of the adjoined two words "Take" w1 and "Away" w2 in the same word order is searched for in the dictionary data which is in the dictionary database 22*b* and corresponds to the character type of each of the words, the two words "Take" w1 and "Away" w2 corresponding to the touched points and being stored in the search word data memory 22*f* (step S18). Then, as shown in FIG. 8B, the phrase search screen Gb which shows the search result "[take] take away" is displayed on the touch panel color display unit 17 (step S7).

Between the two touched points t1 and t2, when a first touched point t1 which specifies the word "Take" w1 is moved upward and a second touched point t2 which specifies the word "It" w2 is moved downward, as shown by arrows m1 and m2 in FIG. 9A (Yes in step S9), the word order of the two words "Take" w1 and "It" w2 stored in the search word data memory 22*f* is maintained (No in step S10→S11*a*), the combination of the words in the word order is set as search words, in which each word is adjoined to or away from the other word (No in step S12→S13*a*), and the movements of the two touched points are determined to be both upward and downward (Yes in step S16).

Then, between the two words "Take" w1 and "It" w2 corresponding to the touched points and stored in the search word data memory 22*f*, the phrase (or example sentence) including the word "Take" w1 corresponding to the touched point t1 moved upward, as a direction word, and further including the combination of the adjoined two words in the same word order, is searched for in the dictionary data which is in the dictionary database 22*b* and corresponds to the character type of each of the words (step S19). Then, as shown in FIG. 9B, the phrase search screen Gb which shows the search result "[take] take it from me" is displayed on the touch panel color display unit 17 (step S7).

Although it is not included in the specific examples of the display operations shown in FIGS. 5A to 9B, a phrase including adjoined two words with their word order maintained is searched for and displayed, when the two touched points t1 and t2 are moved upward and closer to each other (No in step S10→S11*a*, Yes in step S12→S13*b*, Yes in step S14→S18, step S7).

Also, when the two touched points t1 and t2 are moved upward and crossed, a phrase including the two words in the reversed word order, in which each word is adjoined to or away from the other word, is searched for and displayed (Yes in step S10→S11*b*, No in step S12→S13*a*, Yes in step S14→S18, step S7).

Note that the example sentence search process and the phrase search process can also be switched, even when three or more touched points t1, t2, t3 . . . , are detected on the touch panel color display unit 17 in response to the user's operation. The example sentence search process and the phrase search process including each of the words specified by the touched points t1, t2, t3 . . . , can be switched by moving each of the touched points t1, t2, t3 . . . , either downward or upward. Like the above, in that case, the search word can be set by moving each of the touched points t1, t2, t3 . . . , closer to each other or to be crossed with each other. In this case, the search word can be limited to the combination of the adjoined specified words corresponding to the respective touched points t1, t2, t3 . . . , and the order of each of the words in the search word can be changed.

Therefore, according to the word specification search function in the electronic dictionary device 10 having the above configuration, on the text display screen GT displayed on the touch panel color display unit 17, when it is detected that the touched points t1 and t2 are moved downward after a plurality of the desired words w1 and w2 is specified by the touch operation, the example sentence including each of the specified words w1 and w2 is searched for in the dictionary data corresponding to the character type of each of the words and displayed. Also, when it is detected that the touched points t1 and t2 are moved upward, the phrase including each of the specified words w1 and w2 is searched for in the dictionary data corresponding to the character type of each of the words and displayed.

This enables the dictionary search in which a plurality of independent words can be easily specified and the search method can be freely and quickly switched between the example sentence search and the phrase search.

Also, according to the word specification search function of the electronic dictionary device 10 having the above configuration, when it is determined that the touched points t1 and t2 are moved closer to each other upon detection of the movement of each of the touched points t1 and t2, the example sentence or the phrase including the specified words w1 and w2 adjoined to each other is searched for and displayed.

When it is determined that the movement tracks of the touched points t1 and t2 are crossed upon detection of the movement of each of the touched points t1 and t2, the example sentence or the phrase including the specified words w1 and w2 in the reversed word order w2, w1, is searched for and displayed.

This makes it possible not only to perform the dictionary search in which a plurality of independent words is easily specified and the search method is freely and quickly switched between the example sentence search and the phrase search, but also to set a search word in which the relationship between the specified words w1 and w2 is arbitrarily set in accordance with the distance and the positional relationship between the touched points t1 and t2, which are accompanied by the movements of the touched points t1 and t2.

Also, upon detection of the movement of each of the touched points t1 and t2, when it is detected that one of the touched points t1 (t2) is moved upward and the other touched point t2 (t1) is moved downward, the example sentence or the phrase including each of the words w1 and w2 is searched for in the explanatory information in the dictionary data and displayed, the explanatory information including the specified word w1 (w2) as the direction word, which is specified correspondingly to the touched point t1 (t2) moved upward.

Therefore, a plurality of independent words can be easily specified and the example sentence search or the phrase search including each of the words can be quickly performed in the explanatory information in which one of the specified words is included as the direction word.

The method for each of the processes by the electronic dictionary device 10, and the database, which have been described in the embodiment, can be stored in the external recording medium 23 and distributed as programs to be executed by a computer. That is, each of the methods, such as the word specification search process shown in the flowchart of FIG. 4, and the dictionary database 22b, can be stored in the external recording medium 23 and distributed as programs to be executed by a computer. Examples of the external recording medium 23 include a memory card (ROM card, RAM card, and the like), a magnetic disk (floppy disk, hard disk, and the like), an optical disk (CD-ROM, DVD, and the like), and a semiconductor memory. Then, in a computer of an electronic device including the touch panel color display unit 17, the programs stored in the external recording medium 23 are loaded into the memory 22. The operation of the computer is controlled by the loaded program. Thus, the word specification search function for performing the example sentence search or the phrase search described in the embodiment, in which one or more words are specified, can be achieved, and a similar process by the method described above can be performed.

Also, program data for achieving each of the methods can be transmitted in a form of a program code on the network N. The program data is loaded by the communication unit 25 into the computer of the electronic device including the touch panel color display unit 17 connected to the network N. As a result, the word specification search function for performing the example sentence search or the phrase search described above, in which one or more words are specified, can be achieved.

In the embodiment described above, the dictionary device of the present invention is achieved by a single electronic device such as the mobile device dedicated for an electronic dictionary (electronic dictionary device 10), the touch panel PDA 10T, the PC, the mobile phone, the electronic book, and the portable game console, which are provided with the dictionary function.

Alternatively, the word specification search function based on the dictionary database 22b and the information display control program 22a described above can be included in a web server (dictionary server) 31 on the network N. The web server (dictionary server) 31 is accessed by a terminal device including a touch panel color display unit 17. Then, the detected information of the touched points t1, t2 . . . , corresponding to a user's operation on a text display screen GT and the word information specified along with the operation are sent to the web server (dictionary server) 31. As a result, the result of an example sentence search or a phrase search which have been performed in accordance with the movements of the touched points t1, t2 . . . , in the same manner as the above, can be received and displayed.

Not limited to this, the web server (dictionary server) 31 can be accessed by a terminal device including the touch panel color display unit 17. Then, the terminal device sends the detected information of the touched points t1, t2 . . . , corresponding to the user's operation on the text display screen GT, the word information specified along with the operation, and the search request information of the example sentence search or the phrase search corresponding to the movements of the touched points t1, t2 . . . . As a result, in the same manner as the above, the result of the example sentence search or the phrase search performed in accordance with the movements of the touched points t1, t2 . . . , can be received and displayed.

The present invention is not limited to the above embodiments, and can be embodied in various ways in the implementation stage within a range that does not depart from its spirit. Moreover, various embodiments of the invention can be formed by an appropriate combination of a plurality of the components disclosed in the embodiments. For example, even if some components are deleted from all the components illustrated in the embodiments or some components are combined in a different form, if the problem stated in SUMMARY can be solved and the effects of the embodiments of the invention can be obtained, the configuration where the components have been deleted or combined can be extracted as an embodiment of the invention.

What is claimed is:
1. A dictionary device comprising:
a display;
a touch panel; and
a CPU which is configured to:
display a sentence including a plurality of words on the display;

detect a plurality of specified positions corresponding to a user's operation on the touch panel in a state in which the sentence including the words is displayed on the display;

determine a movement state of the specified positions in accordance with the user's operation, after the specified positions on the touch panel are detected;

search dictionary data stored in a memory, the dictionary data including example sentences or phrases including a plurality of words, for an example sentence or a phrase which includes words included in the sentence displayed on the display and specified correspondingly to the specified positions, in accordance with the determined movement state of the specified positions;

wherein, in determining the movement state of the specified positions, the CPU determines whether the specified positions are crossed along with movements of the specified positions; and wherein, when it is determined that the specified positions are crossed, the CPU searches the dictionary data for an example sentence or a phrase including, in a reversed order, the words included in the sentence and specified correspondingly to the specified positions.

2. The dictionary device according to claim 1, wherein in determining the movement state of the specified positions, the CPU determines whether the specified positions are moved closer to each other along with the movements of the specified positions, and when it is determined that the specified positions are moved closer to each other, the CPU searches the dictionary data for an example sentence or a phrase in which the words included in the sentence displayed on the display and specified correspondingly to the specified positions are adjoined.

3. The dictionary device according to claim 1, wherein:

in determining the movement state of the specified positions, the CPU determines whether the specified positions are simultaneously moved in a first direction or a second direction, and the CPU is configured to search the dictionary data for an example sentence including the words included in the sentence displayed on the display and specified correspondingly to the specified positions when it is determined that the specified positions are simultaneously moved in the first direction, and the to search for a phrase including the words included in the sentence displayed on the display and specified correspondingly to the specified positions when it is determined that the specified positions are simultaneously moved in the second direction.

4. The dictionary device according to claim 1, wherein:

the unit memory stores dictionary data in which a direction word is associated with an example sentence or a phrase which includes a plurality of words including the direction word, in determining the movement state of the specified positions, the CPU determines whether the specified positions are simultaneously moved in a first direction and a second direction, respectively, along with the movements of the specified positions, and when it is determined that the specified positions are simultaneously moved in the first direction and the second direction, respectively, the CPU searches the dictionary data for an example sentence or a phrase in which a first word included in the sentence displayed on the display and specified correspondingly to the specified position determined to be moved in the first direction is included as a direction word, and a second word included in the sentence displayed on the display and specified correspondingly to the specified position determined to be moved in the second direction is further included.

5. The dictionary device according to claim 1, wherein, in determining whether the specified positions are crossed, the CPU is configured is to determine whether a first movement track at a first specified position of the specified positions and a second movement track at a second specified position of the specified positions are crossed.

6. The dictionary device according to claim 1, further comprising the memory.

7. A dictionary search method for controlling a computer of an electronic device including a display and a touch panel, the dictionary search method comprising:

displaying a sentence including a plurality of words on the display;

detecting a plurality of specified positions corresponding to a user's operation on the touch panel in a state in which the sentence including the words is displayed on the display;

determining a movement state of the specified positions in accordance with the user's operation, after the specified positions on the touch panel are detected; and searching dictionary data stored in a memory, the dictionary data including example sentences or phrases including a plurality of words, for an example sentence or a phrase which includes words included in the sentence displayed on the display and specified correspondingly to the specified positions, in accordance with the determined movement state of the specified positions, wherein, in the determining of the movement state of the specified positions, it is determined whether the specified positions are crossed along with movements of the specified positions, and wherein, when it is determined that the specified positions are crossed, the searching comprises searching the dictionary data for an example sentence or a phrase including, in a reversed order, the words included in the sentence and specified correspondingly to the specified positions.

8. A non-transitory computer-readable recording medium recording a dictionary program for controlling a computer of an electronic device including a display and a touch panel, the dictionary program causing the computer to perform functions comprising:

displaying a sentence including a plurality of words on the display;

detecting a plurality of specified positions corresponding to a user's operation on the touch panel in a state in which the sentence including the words is displayed on the display;

determining a movement state of the specified positions in accordance with the user's operation, after the specified positions on the touch panel are detected; and dictionary data stored in a memory, the dictionary data including example sentences or phrases including a plurality of words, for an example sentence or a phrase which includes words included in the sentence displayed on the display and specified correspondingly to the specified positions, in accordance with the determined movement state of the specified positions, wherein, in the determining of the movement state of the specified positions, it is determined whether the specified positions are crossed along with movements of the specified positions, and wherein, when it is determined that the specified positions are crossed, the searching comprises searching the dictionary data for an example sentence or a phrase including, in a reversed order, the words included in the sentence and specified correspondingly to the specified positions.

9. A dictionary system comprising:
a server device and a terminal device which include a communication function performed through a network,
wherein:
the terminal device includes:
a display;
a touch panel; and
a computer which is configured to:
display a sentence including a plurality of words on the display;
detect a plurality of specified positions corresponding to a user's operation on the touch panel in a state in which the sentence including the words is displayed on the display; and
send, to the server device, information of the detected specified positions and information of a plurality of words included in the sentence displayed on the display and specified correspondingly to the specified positions;
the server device includes:
a memory which stores dictionary data including example sentences or phrases including a plurality of words; and
a computer which is configured to:
receive, from the terminal device, the information of the plurality of specified positions and the information of the plurality of words specified correspondingly to the specified positions;
determine whether the specified positions are crossed along with movements of the specified positions, after the information of the specified positions and the information of the words specified correspondingly to the specified positions are received;
when it is determined that the specified positions are crossed, search the dictionary data for an example sentence or a phrase including, in a reversed order, the words included in the sentence and specified correspondingly to the specified positions; and
send an example sentence or a phrase found as a result of the searching to the terminal device; and
the computer of the terminal device is further configured to:
receive the example sentence or the phrase sent by the server device in response to the sending of the information of the specified positions and the information of the words corresponding to the specified positions; and
display, on the display, the example sentence or the phrase received from the server device.

10. A server device of a dictionary search system comprising the server device and a terminal device, the server device and the terminal device including a communication function performed through a network, the terminal device including: (i) a display, (ii) a touch panel, and (iii) a computer which is configured to: (a) display a sentence including a plurality of words on the display; (b) detect a plurality of specified positions corresponding to a user's operation on the touch panel in a state in which the sentence including the words is displayed on the display; and (c) send, to the server device, information of the detected specified positions and information of words included in the sentence and specified correspondingly to the specified positions, the server device comprising:
a memory which stores dictionary data including example sentences or phrases including a plurality of words; and
a computer which is configured to:
receive, from the terminal device, the information of the plurality of specified positions and the information of a plurality of words specified correspondingly to the specified positions;
determine whether the specified positions are crossed along with movements of the specified positions, after the information of the specified positions and the information of the words specified correspondingly to the specified positions are received;
when it is determined that the specified positions are crossed, search the dictionary data for an example sentence or a phrase including, in a reversed order, the words included in the sentence and specified correspondingly to the specified positions; and
send an example sentence or a phrase found as a result of the searching to the terminal device.

11. A terminal device of a dictionary search system comprising a server device and the terminal device, the server device and the terminal device including a communication function performed through a network, the terminal device comprising:
a display;
a touch panel, and
a computer which is configured to:
display a sentence including a plurality of words on the display;
detect a plurality of specified positions corresponding to a user's operation on the touch panel in a state in which the sentence including the words is displayed on the display;
send, to the server device, information of the detected specified positions and information of the words included in the sentence displayed on the display and specified correspondingly to the specified positions;
receive an example sentence or a phrase sent from the server device in response to sending of the information of the specified positions and the information of the words corresponding to the specified positions; and
display, on the display, the example sentence or the phrase received from the server device,
wherein server device comprises a memory which stores dictionary data including example sentences or phrases including a plurality of words, and a computer which is configured to (a) determine whether the specified positions are crossed along with movements of the specified positions, after the information of the specified positions and the information of the words specified correspondingly to the specified positions are received from the terminal device, (b) when it is determined that the specified positions are crossed, search the dictionary data for an example sentence or a phrase including, in a reversed order, the words included in the sentence and specified correspondingly to the specified positions, and (c) send the example sentence or the phrase, which is found as a result of the searching, to the terminal device.

12. A terminal device configured to communicate, through a network, with a server device including a memory which stores dictionary data including example sentences or phrases including a plurality of words, the terminal device comprising:
- a display;
- a touch panel, and
- a computer which is configured to:
- display a sentence including a plurality of words on the display;
- detect a plurality of specified positions on the touch panel;
- when the specified positions are moved, determine whether the specified positions are crossed along with movements of the specified positions, after the specified positions on the touch panel are detected;
- when it is determined that the specified positions are crossed, send, to the server device, a search request to search the dictionary data for an example sentence or a phrase including, in a reversed order, the words included in the sentence displayed on the display and specified correspondingly to the specified positions; and
- receive a search result for the search request from the server device, and display the search result.

13. A non-transitory computer-readable recording medium recording a dictionary search program for controlling a computer of a terminal device including a display and configured to communicate, through a network, with a server device including a memory storing dictionary data including example sentences or phrases including a plurality of words, the dictionary search program being executable by the computer of the terminal device to cause the computer to perform functions comprising:
- displaying a sentence including a plurality of words on the display;
- detecting a plurality of specified positions on the touch panel;
- when the specified positions are moved, determining whether the specified positions are crossed along with movements of the specified positions, after the specified positions on the touch panel are detected;
- when it is determined that the specified positions are crossed, sending, to the server device, a search request to search the dictionary data for an example sentence or a phrase including, in a reversed order, the words included in the sentence displayed on the display and specified correspondingly to the specified positions; and
- receive a search result for the search request from the server device, and display the search result on the display unit.

* * * * *